United States Patent [19]

Haynie et al.

[11] 3,801,132

[45] Apr. 2, 1974

[54] EXTENDIBLE BOOM AND MAST TRAILER

[75] Inventors: Jack J. Haynie; David H. Roland, both of Charlotte; Torrence Simpson, Jr., Harrisburg, all of N.C.

[73] Assignee: J. A. Jones Construction Company, Charlotte, N.C.

[22] Filed: Aug. 29, 1972

[21] Appl. No.: 284,591

[52] U.S. Cl.................. 280/404, 52/143, 224/42.06
[51] Int. Cl............................................. B62d 53/06
[58] Field of Search .... 280/404, 415 B, 422, 423 B; 214/390; 224/42.06; 52/143

[56] References Cited
UNITED STATES PATENTS

| 1,996,695 | 4/1935 | Bigley | 280/404 UX |
| 2,380,765 | 7/1945 | Keith | 280/422 UX |
| 2,531,694 | 11/1950 | Larsen | 214/506 |
| 2,872,059 | 2/1959 | Miller | 280/423 B X |
| 3,019,927 | 2/1962 | Sheehan et al. | 280/404 X |
| 3,520,430 | 7/1970 | Dunbar | 214/390 |
| 3,547,469 | 12/1970 | Sancioni | 224/42.06 |

*Primary Examiner*—Leo Friaglia
*Attorney, Agent, or Firm*—Clarence A. O'Brien; Harvey B. Jacobson

[57] ABSTRACT

An assembly for trailing behind a prime mover and including a forward support section for pivotal support from the prime mover and a rear wheeled carriage section defining a low silhouette saddle for cradling an elongated load intermediate its opposite ends. The forward support section includes structure whereby one end of an associated elongated load may be rigidly secured thereto and in this manner the elongated load defines a chassis portion extending between the forward support section and the rear wheeled carriage section. Also, the forward support section and rear wheeled carriage section include coacting structure whereby the sections may be rigidly secured together for transit behind a prime mover when an elongated load is not being transported.

8 Claims, 11 Drawing Figures

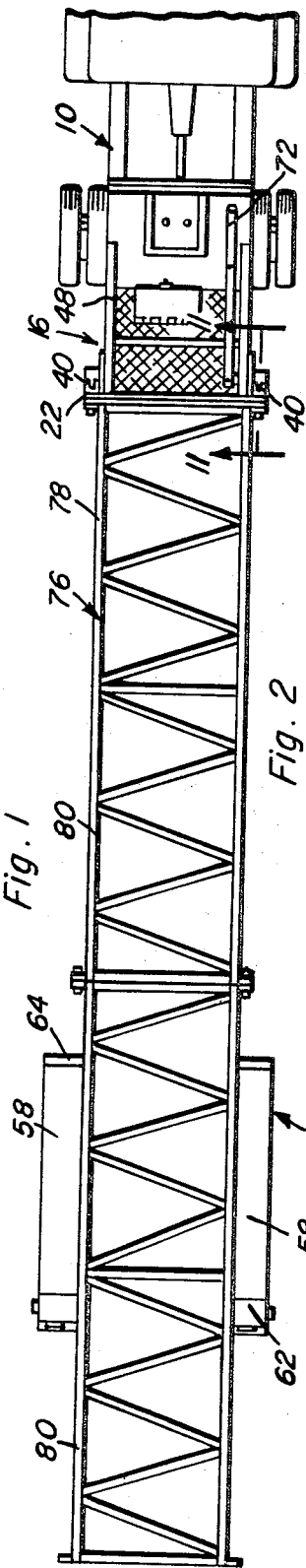
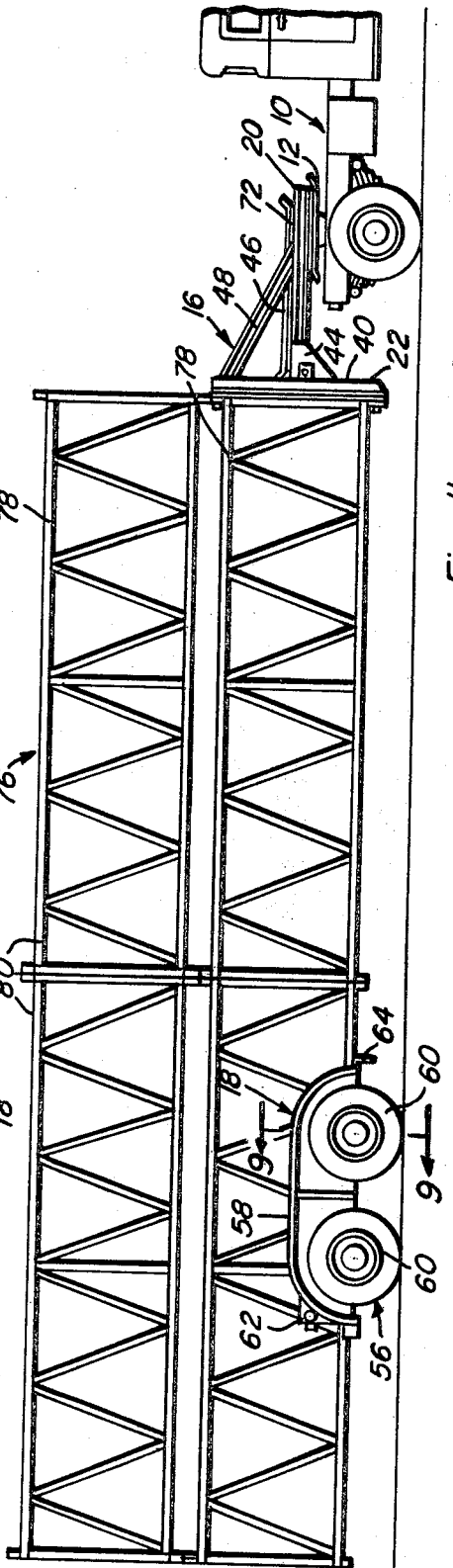
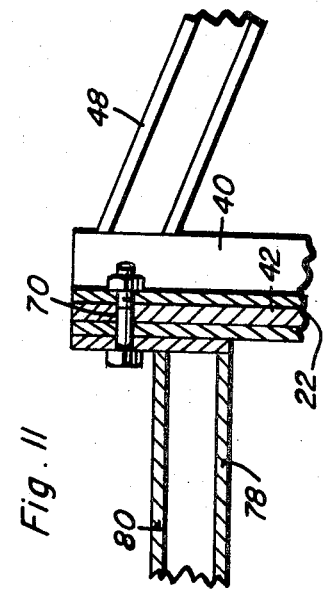
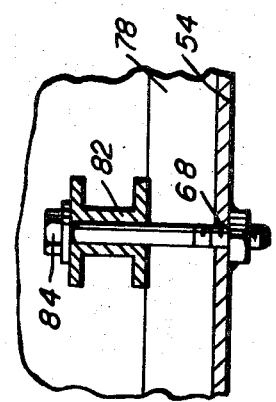
Fig. 1
Fig. 2
Fig. 11
Fig. 10

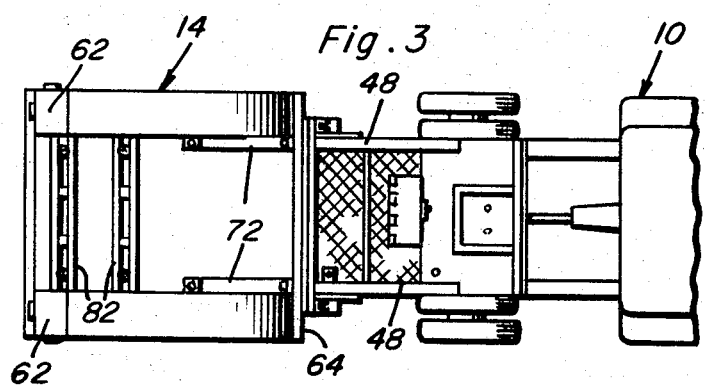
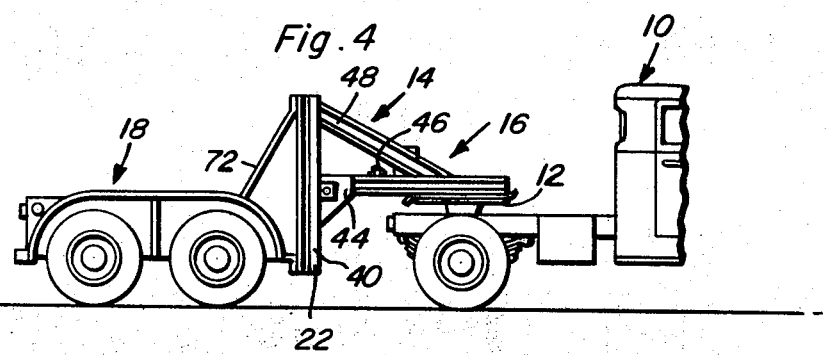
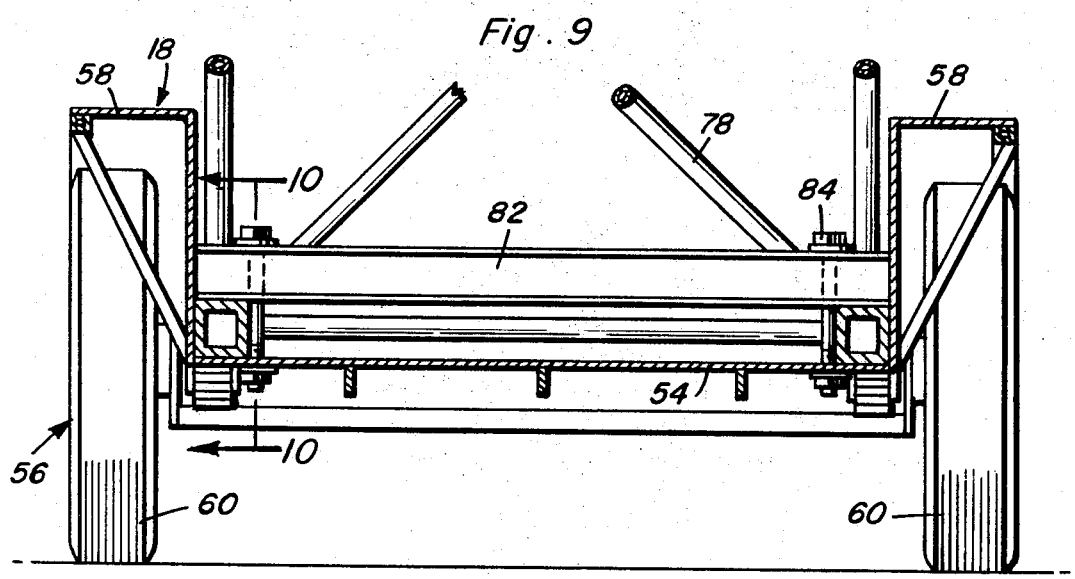

EXTENDIBLE BOOM AND MAST TRAILER

The instant invention has been designed to provide a means of transporting one or more sections of crane boom (or tower crane mast) in an economical and expeditious manner.

In moving large conventional tower cranes from one location to another, construction contractors and other crane owners utilize long wheel base trucks or semi-trailers for transporting sections of the crane booms, such crane sections being in random lengths and often measuring up to 40 feet in length.

All states have limitations on the width, length and height of vehicles and/or loads moving over public steets and highways. The usual maximum width allowed of 8 feet and the usual maximum height allowed is 13 feet and 6 inches. While it is possible to obtain permission for load widths and heights exceeding the stipulated maxima (specially permitted dimensions differing in various states) if the load is not divisible, thus enabling a special permit to be obtained to transport a tractor with a width of 9 feet without its blade if the blade width is in excess of 9 feet and reasonably removable. Additionally, limitations exist on the overall length of a vehicle and/or load and there are certain limitations for the overhand of a load beyond the rear of a truck or trailer. As an example, two crane boom sections of 20 feet each may not be bolted together in end-to-end relation to form a load length of 40 feet to be transported on a trailer with 30 feet of usable deck length. In addition, most larger cranes are equipped with booms exceeding a cross section of four feet by four feet and it is therefore not possible to transport two crane boom sections stowed in side-by-side relation. In addition, even if a low deck trailer is utilized the stacking of two crane booms one on top of the other would result in a total height of the load in excess of 13 feet and 6 inches if the boom sections were each five feet in height, the deck of even a low semi-trailer being greater than 3 feet and 6 inches above the roadway. Accordingly, inasmuch as the crane boom sections are readily dismountable from each other, in most instance if a crane boom utilizes sections of 20 feet in length and on the order of 5 feet in width, only one crane boom section may be carried on each vehicle. This of course results in considerable expense in transporting a large crane from one location to another.

The assembly of the instant invention provides an extremely low silhouette wheeled carriage defining a low saddle upon which a crane boom section may rest with that boom section spaced less than 3 feet and 6 inches above the roadway. Accordingly, a second crane boom section may be stacked on top of the first if the crane boom sections do not greatly exceed five feet in width, thus enabling two crane boom sections to be carried as a load.

Inasmuch as crane boom sections are reasonably light in relation to their strength due to their construction and bracing, a crane boom section may readily comprise or substitute for a chassis between the forward extremity of a semi-trailer and the wheeled running gear. The instant invention provides just such as assembly including a forward support section for attachment to the lowermost crane boom section and pivotal support from an associated prime mover.

The main object of this invention is to provide a trailer type construction which may be utilized to transport more than one crane boom section as an individual load without the load exceeding the length, width or height limitations existing in the various states in this country.

Another object of this invention is to provide a construction which may be readily transported in trailer fashion behind a prime mover with the trailer defined thereby being extremely short and thus readily maneuverable in both forward and backward directions.

Another important object of this invention is to provide a trailer construction in accordance with the preceding objects and which may be readily transported to a point of loading by hauling inboard on a separate trailer or on a truck.

A final object of this invention to be specifically enumerated herein is to provide an assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of the instant invention illustrated in use supporting four crane boom sections each 20 feet in length and arranged in a pair of vertically stacked reaches with each reach consisting of a pair of crane boom sections bolted together in end-to-end relation;

FIG. 2 is a side elevational view of the assembly illustrated in FIG. 1;

FIG. 3 is a top plan view of the instant invention with the rear wheeled carriage section thereof directly connected to the forward support section so as to be trailed behind a prime mover in the manner of a foreshortened semi-trailer;

FIG. 4 is a side elevational view of the assemblage illustrated in FIG. 3;

FIG. 9 is an enlarged fragmentary transverse vertical sectional view taken substantially upon the plane indicated by the section line 9—9 of FIG. 2;

FIG. 10 is a fragmentary enlarged longitudinal vertical sectional view taken substantially upon the plane indicated by the section line 10—10 of FIG. 9; and FIG. 11 is an enlarged fragmentary longitudinal vertical sectional view taken substantially upon the plane indicated by the section line 11—11 of FIG. 1.

Figure 5:
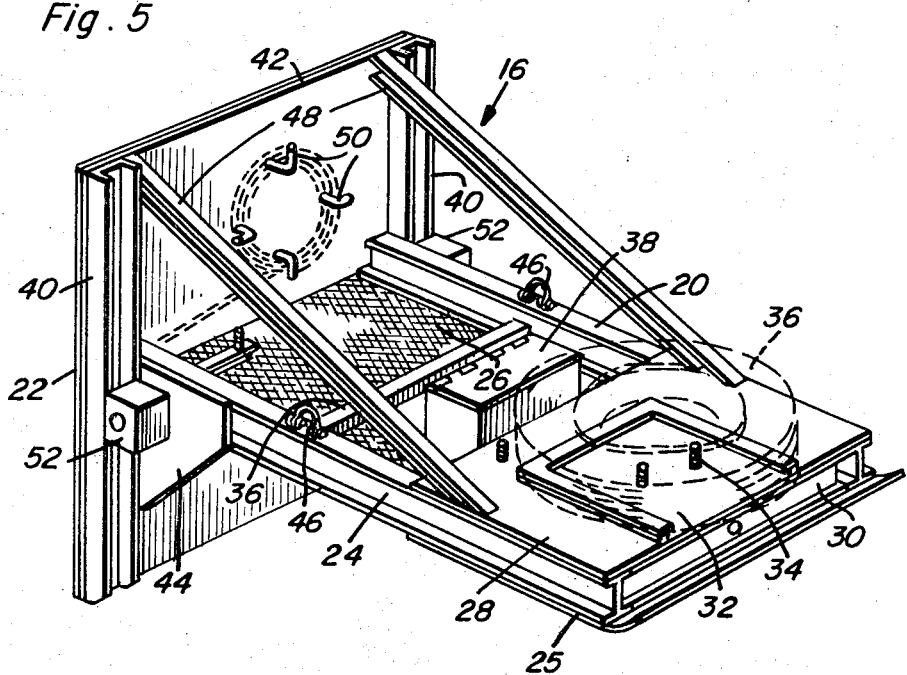
FIG. 5 is a perspective view of the forward support section.
Figure 7:
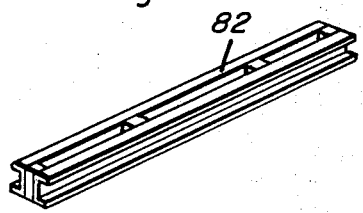
FIG. 7 is a perspective view of one of the two transverse hold-down members provided for rigidly anchoring an associated crane boom section to the wheeled carriage section.
Figure 8:
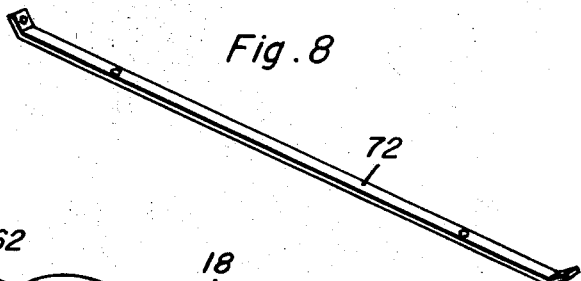
FIG. 8 is a perspective view of one of the inclined braces utilized between the forward support section and the wheeled carriage section when the two sections are secured directly together in the manner illustrated in FIGS. 3 and 4.

Referring now more specifically to the drawings, the numeral 10 generally designates a prime mover of a type usually referred to as a tractor in a tractor-semitrailer combination. The tractor 10 includes a conventional fifth wheel assembly 12 and may be considered as conventional in substantially all respects.

The instant invention is referred to in general by the reference numeral 14 and includes a forward support section generally referred to by the reference numeral 16 and a rear wheeled carriage section referred to in general by the reference numeral 18.

With attention now directed more specifically to FIG. 5 of the drawings, it may be seen that the forward support section 16 comprises a horizontal forward section 20 and an upstanding rear section 22. The forward section 20 comprises a pair of opposite side longitudinal I beams 24 suitably interconnected by means of a lower plate 25 at their forward ends. The lower plate 25 includes a conventional downwardly projecting kingpin (not shown). The rear ends of the I beams 24 are interconnected by means of an expanded metal panel 26 and a top plate 28 is also secured between the forward ends of the I beams 24. Still further, a filler plate 30 is secured between the front ends of the beams 24 and extends between the plates 25 and 28 and a similar rear filler plate is secured between the beams 24 and extends between the rear marginal edge portions of the plates 25 and 28. Also the top plate 28 is provided with a central opening (not shown) closed by means of a sliding door 32. The door 32 may be slid to the open position to provide access to the inner part of the aforementioned kingpin and the upper surface of the sliding door 32 includes a pair of upwardly projecting threaded studs 34 by which a spare wheel and tire combination 36 may be stored in stationary position.

The I beams 24 are also braced by means of a transverse brace 36 as well as other structure not specifically illustrated and a toolbox 38 is supported on the expanded metal panel 26 rearward of the rear marginal edge portions of the plates 25 and 28.

The rear section 22 comprises a pair of upstanding opposite side channel members 40 and a double thickness vertical wall 42 is secured to and extends between the channel members 40. The rear ends of the I beams 24 are secured to the inside portions of the vertical mid-portions of the channel members 40 and suitable gusset plates 44 are provided and brace the I beams 24 relative to the channel members 40. In addition, the I beams 24 include lifting eyes 46 and the upper ends of the channel members 40 are braced relative to the forward end portions of the I beams of forwardly and downwardly inclined bracing channel members 48.

The front surface of the wall 42 is provided with support elements 50 from which coiled power cables as well as air brake lines may be supported. In addition, opposite side portions of the forward support section 16 include the required light assemblies 52.

Figure 6:
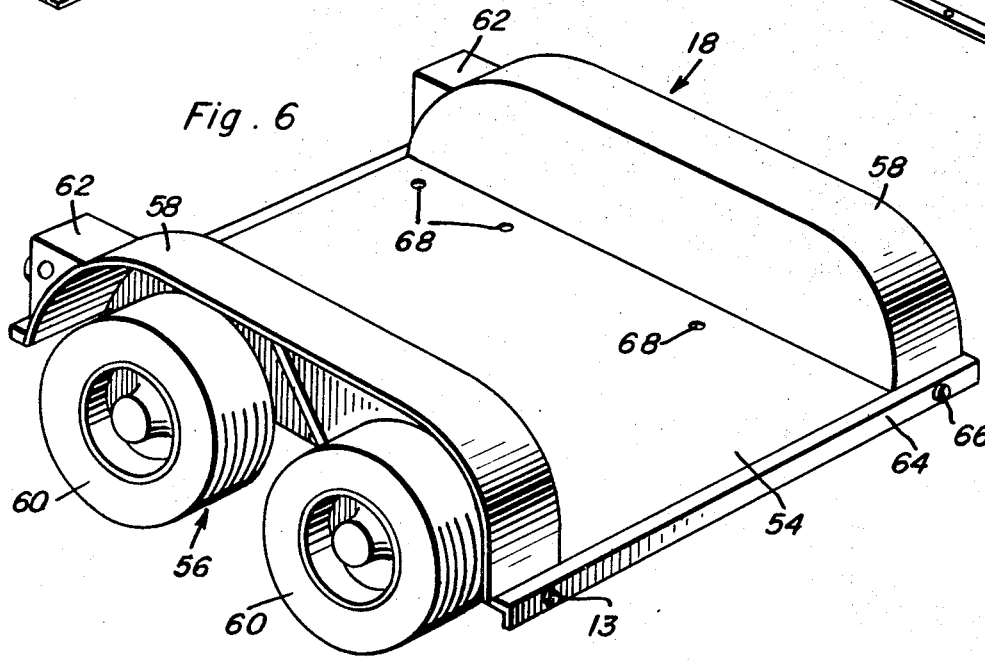
FIG. 6 is a perspective view of the rear wheeled carriage section.

With reference now more specifically to FIGS. 6 and 9 of the drawings, it may be seen that the rear wheeled carriage section 18 includes a transversely extending low flooring 54 which closely overlies the axles of a tandem axle assembly referred to in general by the reference numeral 56. The opposite side marginal edge portions of the floorings 54 include fenders 58 for shielding the wheels 60 of the tandem axle assembly 56 and the fenders 58 include the required light assemblies 62 to which power may be supplied by the electrical lines coiled on the support elements 50. In addition, the tandem axle assembly 56 may (although not necessarily) include air brakes and the air brakes for the carriage section 18 may be serviced by suitable air lines also supported from the support elements 50. Of course, such air lines and electric cables will be removably coupled to the air brake system and electrical system of the prime mover 10 in the conventional manner.

The front end of the carriage section 18 includes a transverse angle member 64 provided with opposite end bores 66 and the flooring 54 includes front and rear pairs of opposite side bores 68. Also, the upper and lower ends of the channel members 40 and the corresponding portions of the wall 42 include bores 70. In operation, the forward support section may be coupled to the fifth wheel 12 of the prime mover 10 in the conventional manner and the angle member 64 of the carriage section 18 may be bolted to the lower ends of the channel members 40. In addition, a pair of angle braces 72 may be bolted between the upper ends of the channel members 40 and one pair of corresponding opposite side bores 68 formed through the flooring 54. In this manner, the rear wheeled carriage section 18 will be rigidly anchored to the rear portion of the forward support section 16 whereby the invention 14 may be trailed behind the prime mover 10 in the manner of a foreshortened semi-trailer. In addition, the entire assembly 14 may be carried by a trailer or on the load bed of a truck. When the assemblage 14 has been transported to a point of loading, the load, such as that illustrated in FIG. 1 and designated by the reference numeral 76 may be arranged in two boom components 78 each comprising a pair of end aligned boom sections 80 bolted together at adjacent ends in the conventional manner. Then, the forward end of the boom component 78 may be bolted to the rear of the front support section 16 by means of bolts secured through the bores 70. Thereafter, the rear wheeled carriage section 18 may be placed beneath the rear end of the lower component 78 so that the component 78 is cradled between the fenders 58. Then, a pair of hold-down beams 82 may be bolted across the lower longitudinal members of the rear beam section 80 and to the flooring 54 by means of bolts 84 secured through the beams 82 and the flooring 54. Thereafter, the upper beam component 76 may be placed in position above the lower beam component and secured thereto in any conventional manner. Then, the forward end of the semi-trailer defined by the wheeled carriage section 18, the load 76 and the front support section 16 may be elevated to enable the tractor 10 to be backed under the lower plate 25 in order that the kingpin supported from the lower plate 25 may be operatively engaged with and locked to the fifth wheel 12. Thereafter, as soon as the suitable electrical connections between the tractor 10 and the electric brakes (not shown) of the tandem axle assembly 56 and various lights 52 and 62 are made, the load 76 may be trailed behind the tractor 10. Of course, if the tandem axle assembly 56 is provided with air brakes, suitable air hoses will be connected between the air brake system of the prime mover 10 and the air brakes of the tandem axle assembly 56.

When the sections 16 and 18 are utilized to support the load, the inclined braces 72 are not utilized, but are secured in stored position upon the front section 20 of the support section 16. Also, when the invention 14 is being used in the manner illustrated in FIGS. 3 and 4 of the drawings, the holddown beams 82 are not placed in use and are supported in a stored condition on the deck 54 of the carriage section 18.

From FIGS. 1 and 2 of the drawings it may therefore be seen that four 20 foot crane boom sections 80 may be readily transported by a single vehicle without the load 76 exceeding height, width or length limitations, even though the crane boom sections 80 may be greater than four feet in width. Even if the same load was to be transported by a "low boy" semi-trailer, the combined height of the load bed of such a trailer and the stacked boom components 78 would exceed 13 feet 6 inches. Also, the length of the beam components 78 is such to prevent them from being carried on a trailer of any height without exceeding the maximum permissible overhang of a load behind a trailer. However, by utilizing the instant invention, the height of the load 76 is maintained sufficiently low to be within limitations even though the load consists of boom sections 80 stacked on top of each other and there is no excessive overhang of the load inasmuch as the load itself comprises the trailer frame extending between the forward support section 16 and the rear wheeled carriage section 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A boom component transporting device comprising a rear section including opposite side ground-engaging wheels and defining a low support structure disposed between said wheels for supporting a portion of an elongated boom component, intermediate the opposite ends thereof, from said support structure with the component disposed between the upper marginal edge portions of said wheels, and a forward section including an upstanding rear portion provided with means for removably stationarily securing one end of said boom component thereto, said forward section also including a forwardly projecting portion equipped with means at its forward end portion adapted for pivotal coupling to a prime mover, said rear section including means for removably stationarily anchoring the supported portion of said boom component thereto, the forward portion of said low support structure of said rear section and the lower end portion of said upstanding rear portion including means for releasably securing said front and rear sections together, and rearwardly and downwardly inclined removable brace members extending and secured between the upper end portion of said upstanding rear portion and opposite side portions of said low support structure spaced rearward of the forward end portion thereof.

2. The combination of claim 1 wherein said forward section includes means for supporting an elongated flexible electrical conductor means therefrom in a stored condition, said rear section including running light means with which one end of said elongated flexible conductor means may be removably electrically connected.

3. The combination of claim 1 wherein said front section includes opposite side lifting anchor means to which lifting cable ends may be secured, said lifting anchor means being disposed in a transverse vertical plane at least closely adjacent the longitudinal center of gravity of said forward section.

4. The combination of claim 1 wherein said forward section includes means for removably supporting a spare wheel therefrom.

5. In combination, a boom transporting device including forward and rear sections, said rear section including opposite side ground-engaging wheels and defining a low support structure disposed between said wheels, an alongated boom component, said boom component being generally horizontally disposed and positioned on and removably secured to said support structure with the opposite end portions of said boom component projecting forwardly and rearwardly of said rear section, said forward section including an upstanding rear portion to which the corresponding end of said boom component is removably and rigidly anchored independent of structural connections, other than said boom component, between said front and rear sections, said forward section further including a forwardly projecting portion, elevated appreciably above the lower portion of the forward end of said boom component, equipped with means at its forward end portion adapted for pivotal coupling to a prime mover.

6. The combination of claim 5 wherein said forwardly projecting portion of said forward section projects forwardly from said rear portion at an elevation spaced generally centrally intermediate the upper and lower ends of said rear portion.

7. The combination of claim 6 including inclined brace means extending forwardly and downwardly between the upper end of said upstanding rear portion and the forward end portion of said forwardly projecting portion, the upper and lower ends of said inclined brace means being secured to said upstanding rear portion and forwardly projecting portion, respectively.

8. The combination of claim 5 wherein the forward portion of said low support structure of said rear section and the lower end portion of said upstanding rear portion include means for releasably securing said front and rear sections together when said boom component is disengaged from said front section and removed from said rear section, and rearwardly and downwardly inclined removable brace members extending and secured between the upper end portion of said upstanding rear portion and opposite side portions of said low support structures faced rearward of the forward end portion thereof.

* * * * *